US006574097B2

(12) United States Patent
Hood, III et al.

(10) Patent No.: US 6,574,097 B2
(45) Date of Patent: Jun. 3, 2003

(54) BATTERY MODULE FOR NOTEBOOK COMPUTERS

(75) Inventors: Charles D. Hood, III, Cedar Park, TX (US); Scott B. Koester, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 09/921,079

(22) Filed: Aug. 2, 2001

(65) Prior Publication Data

US 2003/0026071 A1 Feb. 6, 2003

(51) Int. Cl.$^7$ ............................................... H05K 7/18
(52) U.S. Cl. ..................... 361/683; 361/681; 361/816; 248/581; 345/168
(58) Field of Search .................... 361/683, 680–682, 361/684–686, 801, 802, 816, 818, 724–727; 211/41.17; 345/168; 206/701–702; 248/581, 609; 292/95

(56) References Cited

U.S. PATENT DOCUMENTS 5,580,107 A    12/1996  Howell ..................... 292/95
6,212,066 B1 *  4/2001  Fetterman ................ 361/680
6,392,892 B1 *  5/2002  Sobolewski et al. ...... 361/724
6,442,030 B1 *  8/2002  Mammoser et al. ...... 361/727

\* cited by examiner

Primary Examiner—Darren Schuberg
Assistant Examiner—Hung Van Duong
(74) Attorney, Agent, or Firm—Haynes and Boone, LLP

(57) ABSTRACT

A computer includes a body having a module bay formed therein. A module is removably mounted in the bay. A latch actuator is mounted on the module for movement between a first position and a second position. A first movable catch member extends from a first surface of the module into engagement with the body of the computer and a second movable catch member extends from a second surface of the module into engagement with the body of the computer. A first flexible member interconnects the first catch member and the latch actuator. A second flexible member interconnects the second catch member and the latch actuator. As a result, movement of the latch actuator from the first position to the second position, moves the first and second flexible members and retracts the first and second catch members out of engagement with the body of the computer.

21 Claims, 5 Drawing Sheets

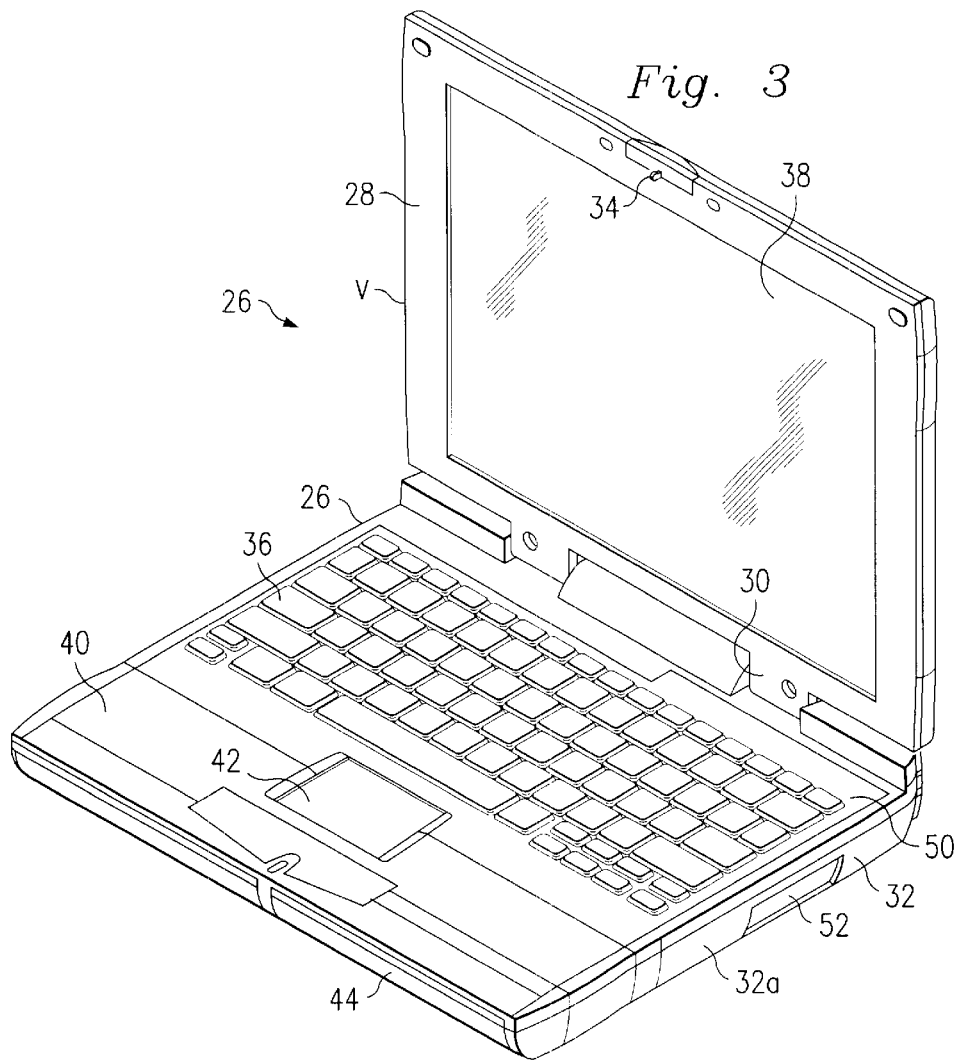
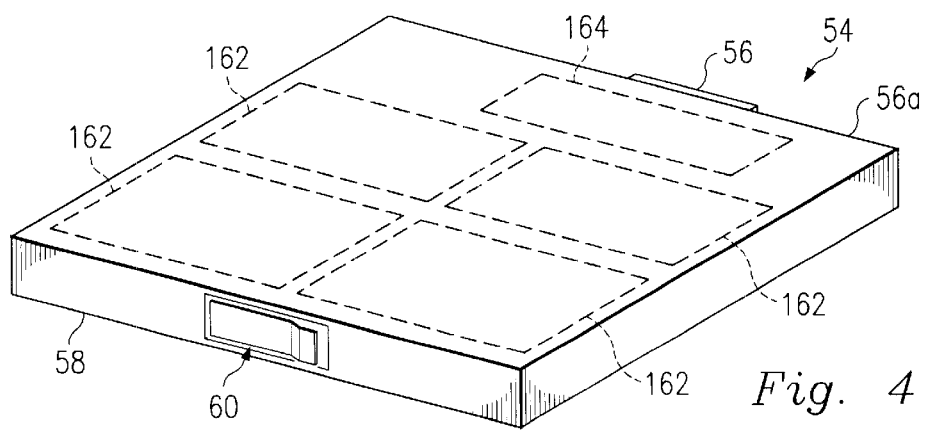

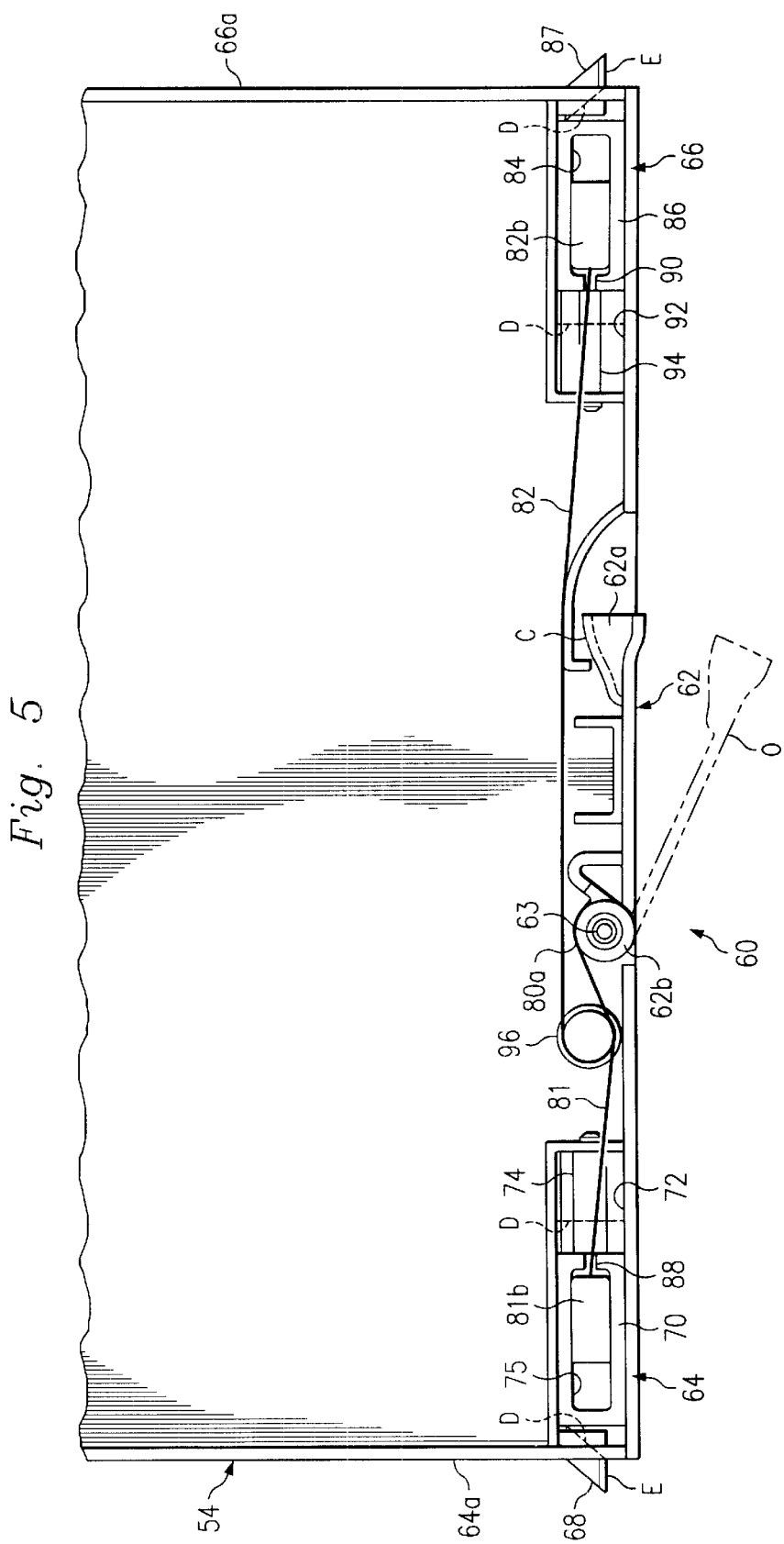

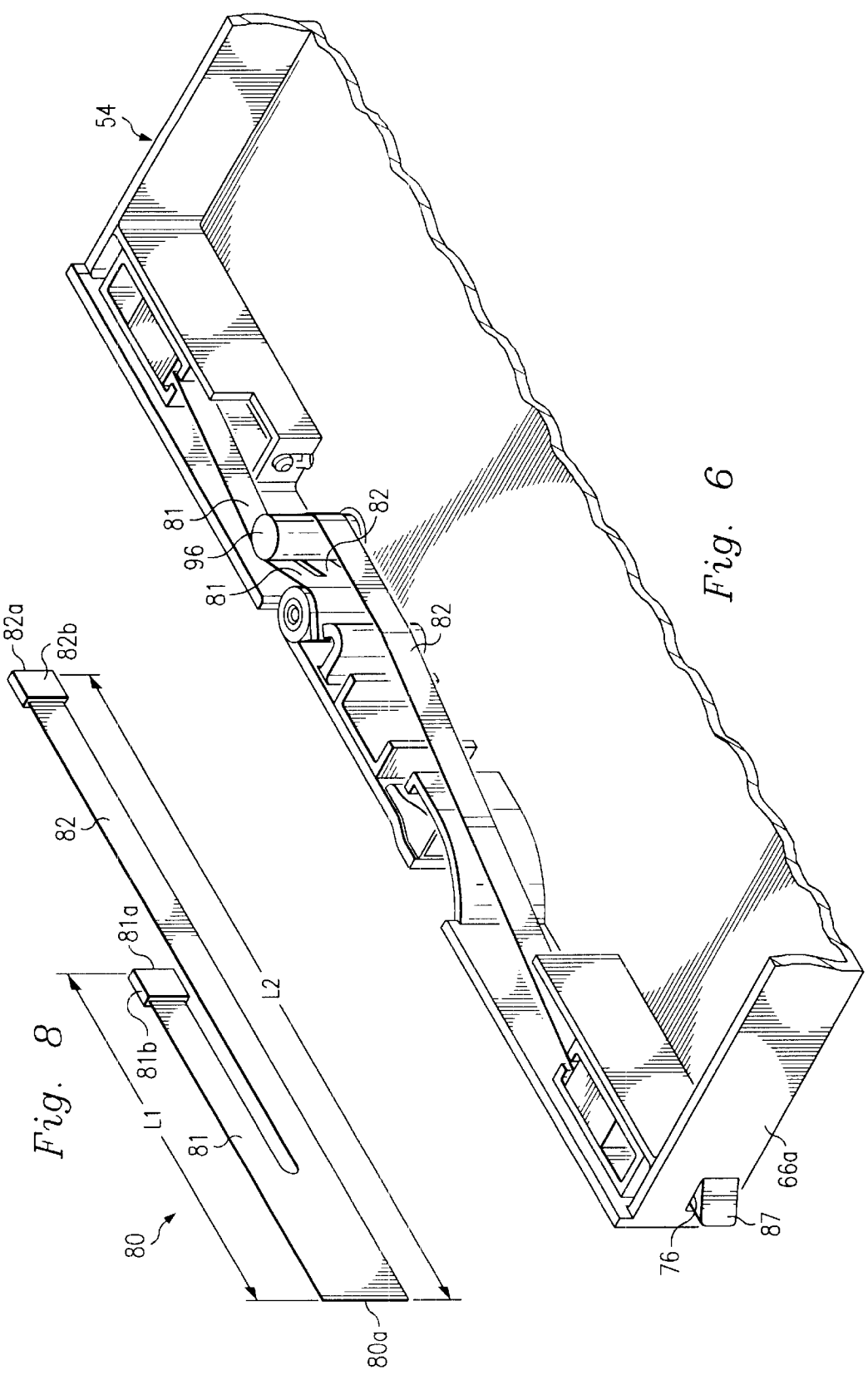

BATTERY MODULE FOR NOTEBOOK COMPUTERS

BACKGROUND

The disclosures herein relate generally to computer systems and more particularly to a replaceable battery module for a notebook computer.

In a notebook computer, it is desirable to allow a removable storage device to be replaced with an additional battery module as the user requires. In order to secure the battery module into the computer, some type of latch feature is required. The utility of the battery module is extended when the design is standardized such that it is interchangeable within a family of products. Users have enjoyed such interchangeability for several years, and it has contributed to manufacturing and engineering efficiencies. Today, there is a need to redefine the battery and storage module for use in smaller notebook computers and to accommodate new interfaces, and battery technologies. Removable storage modules like CDROMs have a unique shape. Therefore, optimizing the bay for both storage modules and batteries will generally require some tradeoff. It is desirable to minimize the notebook computer size and maximize the expandability (including extended battery life) by creating a flexible module interface.

Currently, some notebook computers have a media bay latch mechanism on the bottom of the notebook computer housing. The bay is very flexible in that it will house a battery pack with eight 18 mm diameter cells, in addition to a CDROM or other storage device. The downside is that significant space is wasted in the notebook computer, and the module cannot be removed when the notebook computer is docked. Some current notebook computers have a thinner media bay that can also house a battery. The module shape matches the unusual shape of the CDROM, and the latch and extraction mechanism is located in the notebook computer. Because the latch in the notebook computer consumes space under the module, the battery pack thickness is limited to the CDROM thickness. This has severely limited the ability to fit a high capacity battery in the media bay.

Some products have had bays for removable batteries or drives that included integrated fastening and removal mechanisms. Examples include the XPI battery, XPI hard drive and CPx hard drive manufactured by Dell Computer Corporation of Austin, Tex. In each of the above examples, the extensibility and flexibility of the module is limited in that the XPI battery and CPx hard drive modules include part of the bottom surface of the notebook computer, and they cannot be used across different notebook families where the drive may be mounted at a different height. The XPI hard drive latch is included at the front corner of the notebook computer outline, and is restricted to the front left location of the notebook. None of these examples were designed to be a flexible expansion bay that may accept hard drives, CD-ROMs, and battery modules.

Therefore, what is needed is a durable, easily removable battery module which is of a reduced size for compatibility with a media bay of smaller notebook computer sizes.

SUMMARY

One embodiment, accordingly, provides a removable battery module for a notebook computer which has a quick latch device. To this end, a latch assembly includes a support body and a latch actuator mounted on the support body for movement between a first position and a second position. A first movable catch member extends from a first surface of the support body and a second movable catch member extends from a second surface of the support body. A first flexible member interconnects the first catch member and the latch actuator. A second flexible member interconnects the second catch member and the latch actuator. As a result, movement of the latch actuator from the first position to the second position, moves the first and second flexible members and retracts the first and second catch members towards the support body.

A principal advantage of this embodiment is that a battery module can be removed by a one-handed motion at one point of contact with the latch actuator.

BRIEF DESCRIPTION OF THE DRAWINGS

FIG. 3 is another perspective view illustrating an embodiment of a portable computer.

FIG. 4 is a perspective view illustrating an embodiment of a battery module.

FIG. 5 is a partial top view illustrating an embodiment of a latch device for the battery module.

FIGS. 6 and 7 are partial perspective views further illustrating the latch device.

FIG. 8 is a perspective view illustrating an embodiment of a flexible link for the latch device.

DETAILED DESCRIPTION

Figure 1:
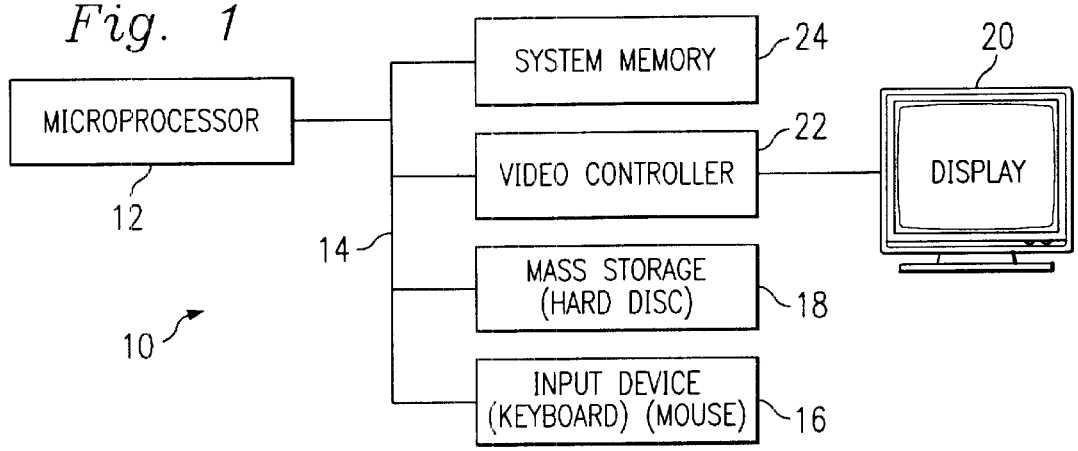
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of busses and intermediate circuits can be deployed between the components described above and microprocessor 12 to facilitate interconnection between the components and the microprocessor.

Figure 2:
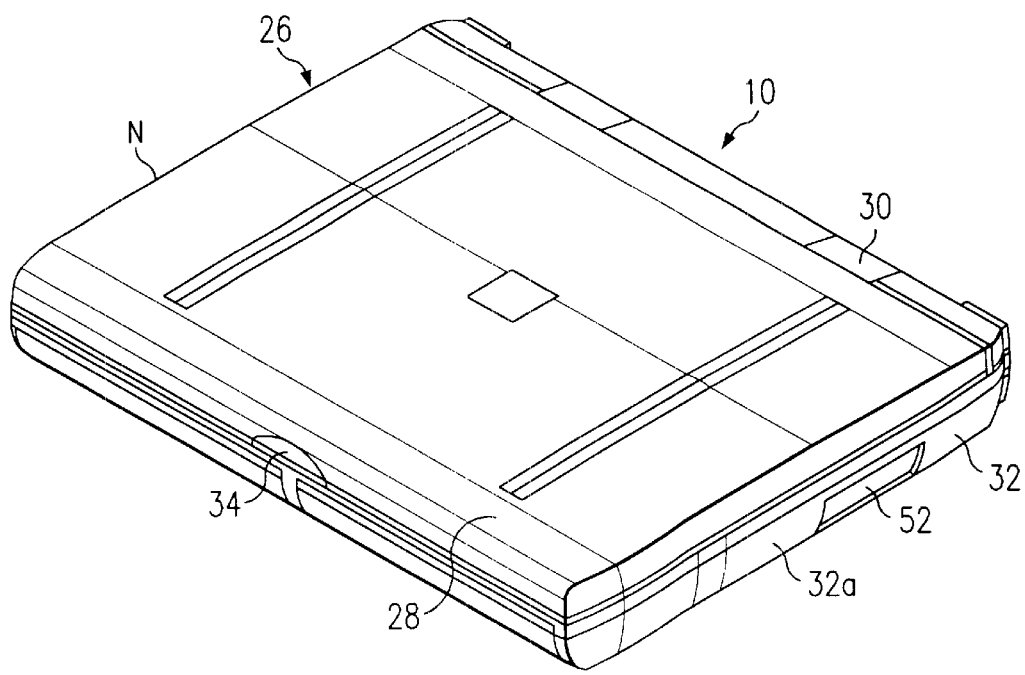
FIG. 2 is a perspective view illustrating an embodiment of a portable computer.

Referring to FIG. 2, illustrated is a portable, notebook size computer designated 26 comprising a self-contained system, such as that illustrated at 10 in FIG. 1, and including a hinged top or lid 28 rotable about a hinge or hinges 30 from a nested position, "N," with a horizontal chassis base 32, to a substantially vertical or open position "V," FIG. 3. Opening of the notebook style portable computer by manipulation of a latch 34, reveals of plurality of input components such as a keyboard of keys 36 on base 32, and a monitor screen 38 mounted in lid or top 28. Base 32 includes a palm or wrist area 40 including an input area 42 of the input system 16 positioned above a battery housing 44 and adjacent keys 36. Base 32 includes an exterior surface 50. The keyboard keys 36 and also the adjacent palmrest area 40 are provided on the exterior surface 50.

A module bay 52 is provided in a side 32a of base 32. Bay 52 may house a removable CD-ROM module or hard disk drive (HDD) module as is well known. Also, bay 52 may house a battery module 54 which may be interchanged in the bay 52 with the CD-ROM or HDD modules. In this manner, a removable storage device such as the CD-ROM or HDD module is replaced with an additional battery. Furthermore, the battery module 54 may be interchanged between other notebook computers or between a notebook computer and a desktop computer.

The battery module 54, FIG. 4, is generally rectangular and includes a plug 56 at a first end 56a which is inserted into the bay 52. A plug receptacle (not shown) is positioned within bay 52 for receiving plug 56. A second end 58 of battery module 54 seats flush with side 32a of base 32 when the module 54 is inserted into bay 52. A latch device 60 at second end 58, provides for easy retention and removal of battery module 54 in bay 52. A plurality of batteries 162 are positioned within module 54, and some basic interface circuitry 164 is also provided.

Latch device 60, FIG. 5, is supported in battery module 54 and includes a latch actuator 62 which includes a first or grip end 62a and a second or pivot end 62b pivotally movable about a pivot point 63 for movement between a first or closed position C and a second or open position O.

Figure 7:
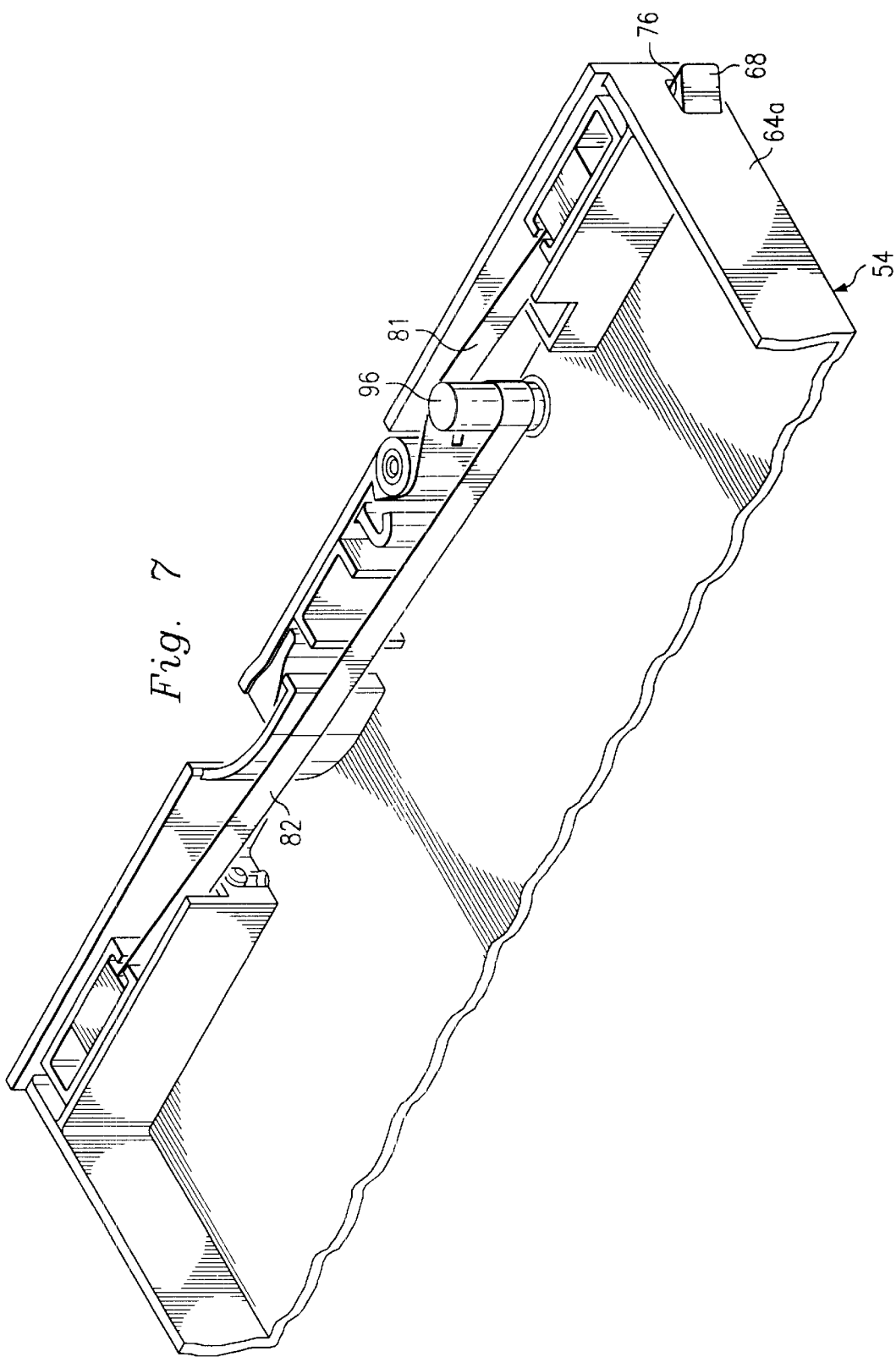

A first catch member 64 and a second catch member 66, FIG. 5, are each provided to extend from a respective side surface 64a, 66a of module 54. The catch members 64, 66 are identical in structure and function and therefore, only one will be fully described. Catch member 64 includes a catch 68 connected to a first slide 70. The first slide 70 is resiliently mounted in a slot 72 by means of a resilient member 74 which is compressed against first slide 70 to urge catch 68 to extend through an opening 76, FIGS. 6 and 7, in either side surface 64a, 66a. First slide 70, FIG. 5, includes a slot 75 formed therein for receiving a terminal end of a flexible member to be discussed below in greater detail.

First slide 70 is actuated by latch actuator 62 by means of a flexible link. The flexible link may be a pair of flexible members such that each is attached to latch device 60 and each is respectively attached to catch members 64 and 66. Preferably, a flexible link 80, FIG. 8, is a molded one-piece member which has a first end 80a, a first flexible member 81 and a second flexible member 82. The first flexible member 81 is of a first length L1 and the second flexible member 82 is of a second length L2, which is greater then L1. A terminal end 81a of first flexible member 81 includes a tab 81b. A terminal end 82a of second flexible member 82 includes a tab 82b. Tab 81b is movably seated in slot 75 of slide 70. Tab 82b is movably seated in a slot 84 of a second slide 86, including a catch 87, of second catch member 66. First flexible member 81 extends from slide 70 via an opening 88 and second flexible member 82 extends from slide 86 via an opening 90. Slide 86 is resiliently mounted in a slot 92 by means of resilient member 94 similar to resilient member 74, described above. Each of the flexible members 81, 82 engage an idler 96, FIGS. 5–7, however, flexible member 82 reverses direction by means of being partially wrapped around idler 96.

In operation, in order to minimize the design constraints placed upon a notebook computer, the battery module has all the features associated with latching and extraction integrated into the module itself. Due to this fact, the module latching mechanism is customer replaceable. This significantly reduces manufacturer service and warranty cost by permitting the manufacturer to replace broken latches by mailing a new battery module to the customer instead of dispatching a service technician. Incorporating the latching mechanism into the module also allows different modules to have different latching mechanisms. Therefore, the mechanisms can be located in different areas to minimize the module's volume. For instance, optical drives have an area which is often wasted in module design. Using such an area for the latching mechanism will help minimize the overall module size. A battery, on the other hand, is optimized for battery cells when it has a large rectangular space available to place cells. This makes it desirable to place the catching mechanism in the front of the battery module.

When latch actuator 62 is moved from position C to position O, flexible member 81 urges slide 70 against resilient member 74 and flexible member 82 urges slide 86 against resilient member 94. This action simultaneously moves slides 70, 86 and catches 68, 87 to a retracted, dotted line, position D which retracts the catches 68, 87 into module 54. When latch actuator 62 is released to position C, resilient members 74, 94 urge catches 68, 87 to an extended at rest position E.

As can be seen, the principal advantages of these embodiments are that the dual latches improve strength and help to center the module in the bay. A single action retracts both latches (on opposite sides of module). A thin plastic film or fabric is used (in tension) to retract the latches. This material provides a robust, low cost method of retracting two latches while occupying minimal space. The potential to mold the thin plastic strap with the locating pins and slides could provide significant cost savings by reducing assembly time. The thin strip wraps around a bobbin attached to the door to actuate the latches. The door opening motion directly moves the strap, thereby eliminating any linkage or additional moving parts that would create additional failure modes. The battery module also utilizes a cylinder shaped protrusion (acting as a pulley) to reverse the direction of travel. This reduces the tolerance of the mechanism by actuating both latches in different directions with one single part. The battery module latching and extraction is intuitive to the user. It requires only one hand and one point of contact to unlatch and remove.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A latch assembly comprising:
   a support body;
   a latch actuator mounted on the support body for movement between a first position and a second position;
   a first movable catch member extending from a first surface of the support body and a second movable catch member extending from a second surface of the support body;
   a first flexible member interconnecting the first catch member and the latch actuator; and
   a second flexible member interconnecting the second catch member and the latch actuator, whereby, movement of the latch actuator from the first position to the second position, moves the first and second flexible members and retracts the first and second catch members toward the support body.

2. The assembly as defined in claim 1 wherein the first and second catch members are resiliently mounted in the support body.

3. The assembly as defined in claim 1 wherein the first and second catch members are resiliently biased to extend from the support body.

4. The assembly as defined in claim 1 wherein the first and second flexible members are connected for movement with the first and second catch members.

5. The assembly as defined in claim 1 wherein each of the flexible members has a first end connected to the latch actuator and a second end connected to a respective catch member.

6. The assembly as defined in claim 1 wherein the first and second flexible members are formed as an integral part, one of the flexible members having a greater length than the other of the flexible members.

7. The assembly as defined as claim 4 wherein the first and second flexible members are connected for movement relative to the first and second catch members.

8. A computer comprising:
   a body of the computer having a module bay formed therein;
   a module removably mounted in the bay;
   a latch actuator mounted on the module for movement between a first position and a second position;
   a first movable catch member extending from a first surface of the module into engagement with the body of the computer, and a second movable catch member extending from a second surface of the module into engagement with the body of the computer;
   a first flexible member interconnecting the first catch member and the latch actuator;
   a second flexible member interconnecting the second catch member and the latch actuator, whereby, movement of the latch actuator from the first position to the second position, moves the first and second flexible members and retracts the first and second catch members out of engagement with the body of the computer.

9. The computer as defined in claim 8 wherein the first and second catch members are resiliently mounted in the body.

10. The computer as defined in claim 8 wherein the first and second catch members are resiliently biased to extend from the body.

11. The computer as defined in claim 8 wherein the first and second flexible members are connected for movement with the first and second catch members.

12. The computer as defined in claim 8 wherein each of the flexible members has a first end connected to the latch actuator and a second end connected to a respective catch member.

13. The computer as defined in claim 8 wherein the first and second flexible members are formed as an integral part, one of the flexible members having a greater length than the other of the flexible members.

14. The computer as defined in claim 11 wherein the first and second flexible members are connected for movement relative to the first and second catch members.

15. A computer system comprising:
   a chassis having a module bay formed therein;
   a microprocessor in the chassis;
   a mass storage coupled to the microprocessor;
   a module removably mounted in the bay;
   a latch actuator mounted on the module for movement between a first position and a second position;
   a first movable catch member extending from a first surface of the module into engagement with the chassis, and a second movable catch member extending from a second surface of the module into engagement with the chassis;
   a first flexible member interconnecting the first catch member and the latch actuator; and
   a second flexible member interconnecting the second catch member and the latch actuator, whereby, movement of the latch actuator from the first position to the second position, moves the first and second flexible members and retracts the first and second catch members out of engagement with the chassis.

16. The system as defined in claim 15 wherein the first and second catch members are resiliently mounted in the chassis.

17. The system as defined in claim 15 wherein the first and second catch members are resiliently biased to extend from the chassis.

18. The system as defined in claim 15 wherein the first and second flexible members are connected for movement with the first and second catch members.

19. The system as defined in claim 15 wherein each of the flexible members has a first end connected to the latch actuator and a second end connected to a respective catch member.

20. The system as defined in claim 15 wherein the first and second flexible members are formed as an integral part, one of the flexible members having a greater length than the other of the flexible members.

21. The system as defined in claim 18 wherein the first and second flexible members are connected for movement relative to the first and second catch members.

\* \* \* \* \*